United States Patent [19]

Bowie, Jr. et al.

[11] 4,136,888

[45] Jan. 30, 1979

[54] TRANSPORT DEVICE FOR INVALIDS

[75] Inventors: William R. Bowie, Jr.; George B. Sampson, both of Baltimore, Md.

[73] Assignee: The United States of America as represented by the Department of Health, Education and Welfare, Washington, D.C.

[21] Appl. No.: 840,378

[22] Filed: Oct. 7, 1977

[51] Int. Cl.[2] .................................... B62B 5/02

[52] U.S. Cl. ............................ 280/5.22; 280/47.25

[58] Field of Search ................. 280/5.2, 5.22, 47.28, 280/47.25, DIG. 10, 242 WC, 5.24, 5.28; 297/DIG. 4, 60; 5/81 R; 180/8 A

[56] References Cited

U.S. PATENT DOCUMENTS

| | | | |
|---|---|---|---|
| 2,301,341 | 11/1942 | Stevens | 280/5.22 |
| 2,726,875 | 12/1955 | Murcott | 297/60 |
| 2,775,463 | 12/1956 | Chenette | 280/47.37 R |
| 3,111,331 | 11/1963 | Locke | 280/5.22 |
| 3,640,571 | 2/1972 | Keropian | 297/DIG. 4 |
| 3,655,212 | 4/1972 | Krass | 280/47.28 |

*Primary Examiner*—Joseph F. Peters, Jr.
*Assistant Examiner*—R. Schrecengost
*Attorney, Agent, or Firm*—Browdy and Neimark

[57] ABSTRACT

A tubular metal chair frame covered with canvas with a two-wheeled pivoted upwardly foldable front end and a pivoted rear support stand with two swivelled additional wheels, the support stand being lockable in a normal rearward position with the swivelled wheels engaging the floor and spaced rearwardly from the two front wheels. The support stand is foldable upwardly and can be locked in an elevated position, substantially coplanar with the upper portion of the frame. The lower portion of the frame is provided with a pair of parallel tread belts mounted on supports having rollers underlying the belts, the belts being located behind the front wheels and being usable to engage the edges of steps when the chair and its occupant are moved down stairs. Foldable handles are provided on the front end of the frame.

13 Claims, 8 Drawing Figures

TRANSPORT DEVICE FOR INVALIDS

FIELD OF THE INVENTION

This invention relates to transport devices for non-ambulatory persons, and more particularly to a foldable chair device especially adapted to facilitate the transportation of non-ambulatory persons or invalids down stairways.

BACKGROUND OF THE INVENTION

There is a need for a practical and reliable carrier device to facilitate the evacuation of non-ambulatory persons from multistoried buildings during emergencies, such as fires, bombings, and other instances where elevators are inoperative or cannot be utilized. For example, Government Services Administration regulations and Maryland law forbid the use of elevators to evacuate people during fires unless they have been approved by fire department personnel on the scene. Therefore, it would be highly advantageous to have available means providing the capability of evacuating physically handicapped persons down stairways without exerting the heavy physical effort required to pick up and carry them out.

There do not appear to be available in the prior art any devices to enable a handicapped person or invalid to be safely and conveniently transported down stairways without the use of equipment requiring the person to be lifted bodily and to be conveyed by supporting the total weight of the handicapped person, for example, by employing a stretcher, or similar device requiring the total weight to be supported by two assisting individuals, one at each end, and requiring strenuous effort on the part of said assisting individuals.

A preliminary search reveals the following prior U.S. Pat. Nos., which appear to represent the closest prior art: Klever, 1,702,010; Smith, 2,281,209; Lackey, 2,438,059; Daniel, 3,386,111; Ingemansson, 3,495,869; Davis et al., 4,010,499.

SUMMARY OF THE INVENTION

Accordingly, a main object of the invention is to provide a transport device for non-ambulatory persons which overcomes the deficiencies of the prior art devices.

A further object of the invention is to provide a novel and improved transport device for an invalid or physically handicapped person, said device being relatively simple in construction, being easily foldable to a compact condition for transportation or storage, and enabling the person occupying same to be easily and safely trasnported down stairways without the necessity of supporting the total weight of said person.

A still further object of the invention is to provide an improved transport device for non-ambulatory persons, said device being in the general form of a wheeled chair which can be folded up to reduce its bulk when not in use, the device being provided with tread belt contact and bearing means engageable on the edges of steps to facilitate movement downwardly of the occupant on stairways or ledges, and enabling such movement to be accomplished in a safe and smooth manner and without strenuous effort on the part of the assisting individuals.

BRIEF DESCRIPTION OF THE DRAWINGS

Further objects and advantages of the invention will become apparent from the following description and claims, and from the accompanying drawings, wherein:

DESCRIPTION OF A PREFERRED EMBODIMENT

Figure 1:
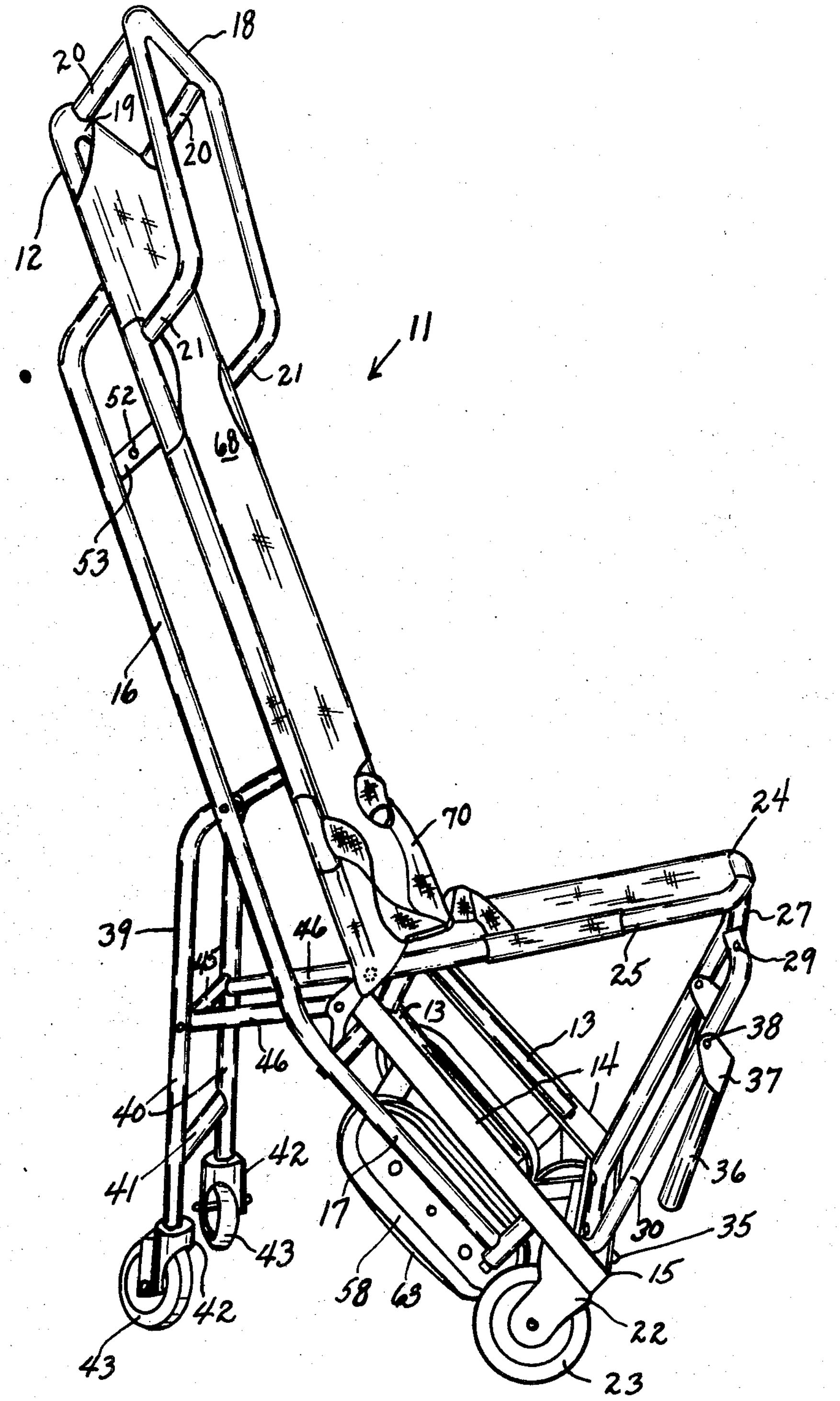
FIG. 1 is a side perspective view of an improved wheeled chair transport device constructed in accordance with the present invention.

Referring to the drawings, 11 generally designates a typical transport device according to the present invention. The device 11 comprises an elongated rigid main frame having a generally U-shaped tubular-metal main portion 12 with downwardly and forwardly angled parallel end portions 13, as viewed in FIG. 1, said end portions 13 being rigidly secured in the side bar portions 14 of a generally rectangular bottom frame 15 constructed of angle bars. The rigid main frame is provided with tubular-metal, rearwardly-offset side-reinforcing bars 16, 16 having downwardly and forwardly angled lower portions 17 extending parallel to the angle-bar bottom frame side bar members 14. Said rigid main frame is further provided at its top end, as viewed in FIG. 1, with a forwardly offset, tubular-metal marginal rail member 18, rigidly secured to the transverse top end 19 of main frame portion 12 by spaced tubular post elements 20, 20 and by its downwardly and forwardly bent front ends 21, 21.

The front corner portions of bottom frame 15 are provided with depending wheel brackets 22 in which are journalled respective parallel ground-engaging front wheels 23, 23.

Figure 2:
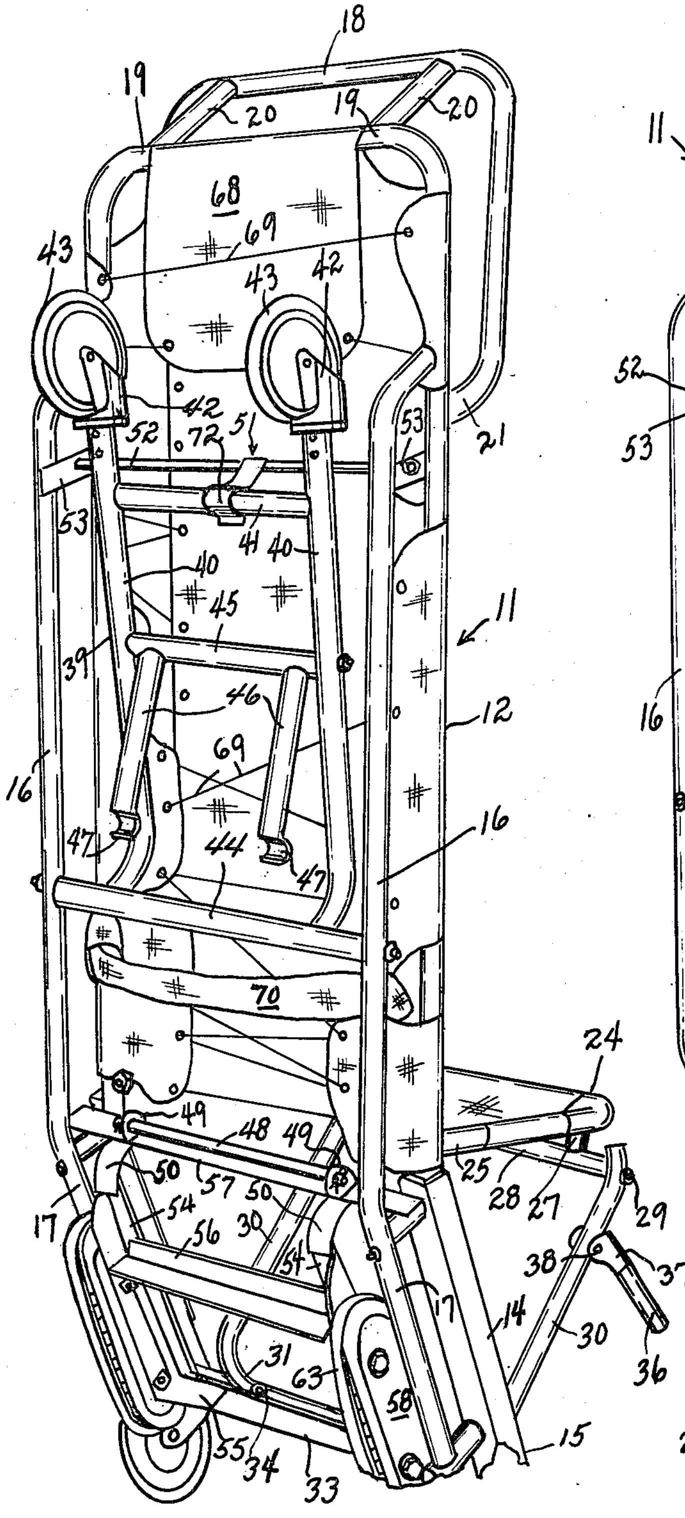
FIG. 2 is a fragmentary rear perspective view of the transport device of FIG. 1, with the rear support stand portion thereof locked in its upwardly folded elevated position.
Figure 3:
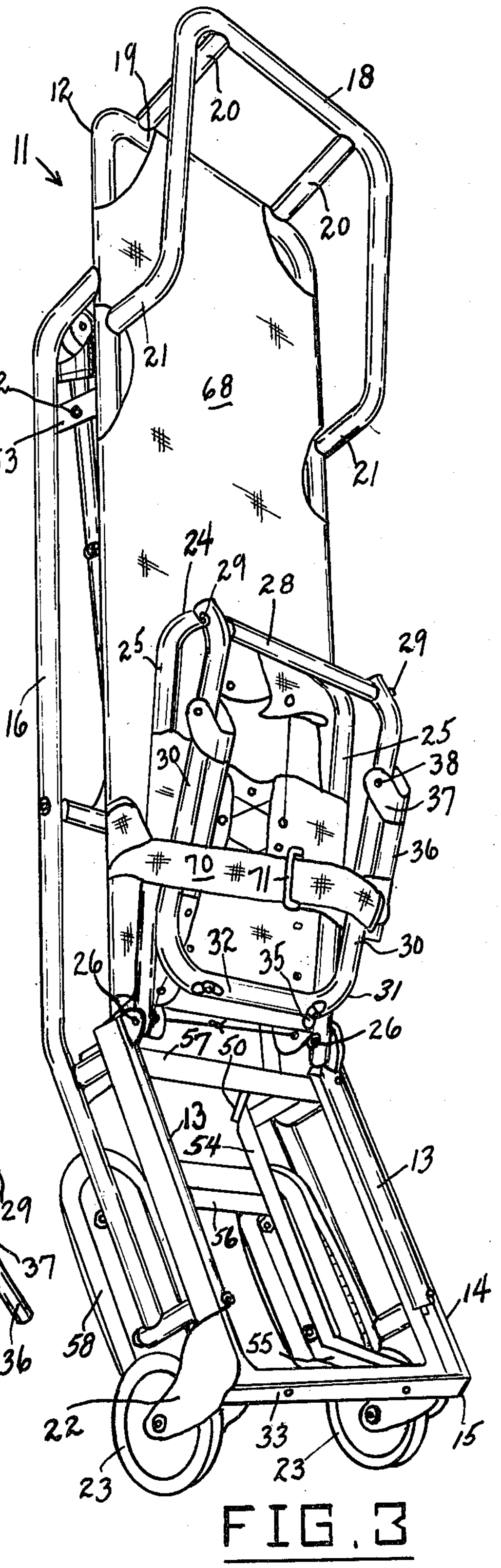
FIG. 3 is a front perspective view of the transport device of FIG. 1 with both the rear support stand portion and the front seat portion thereof locked in upwardly folded elevated positions, for convenient transportation or storage.
Figure 5:
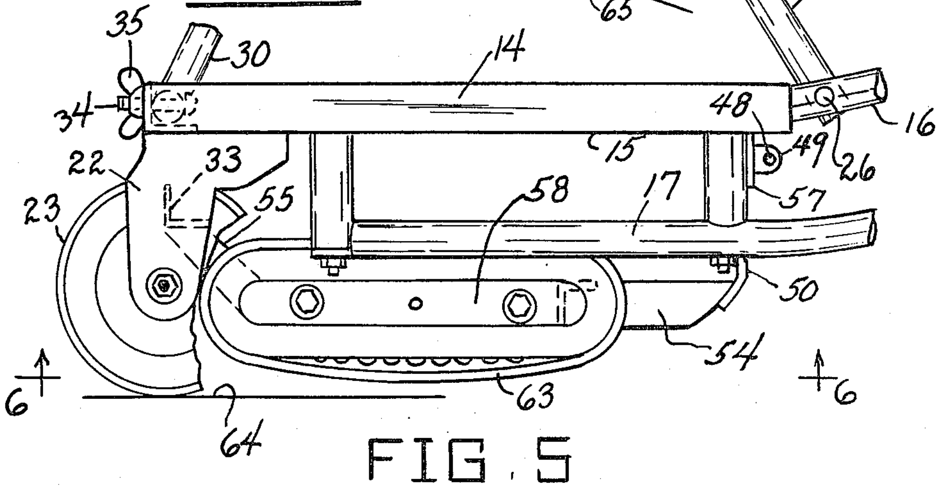
FIG. 5 is an enlarged side elevational view of the lower framework portion of the transport device of FIG. 1, partly broken away, and showing one of the tread belt assemblies of the device.
Figure 6:
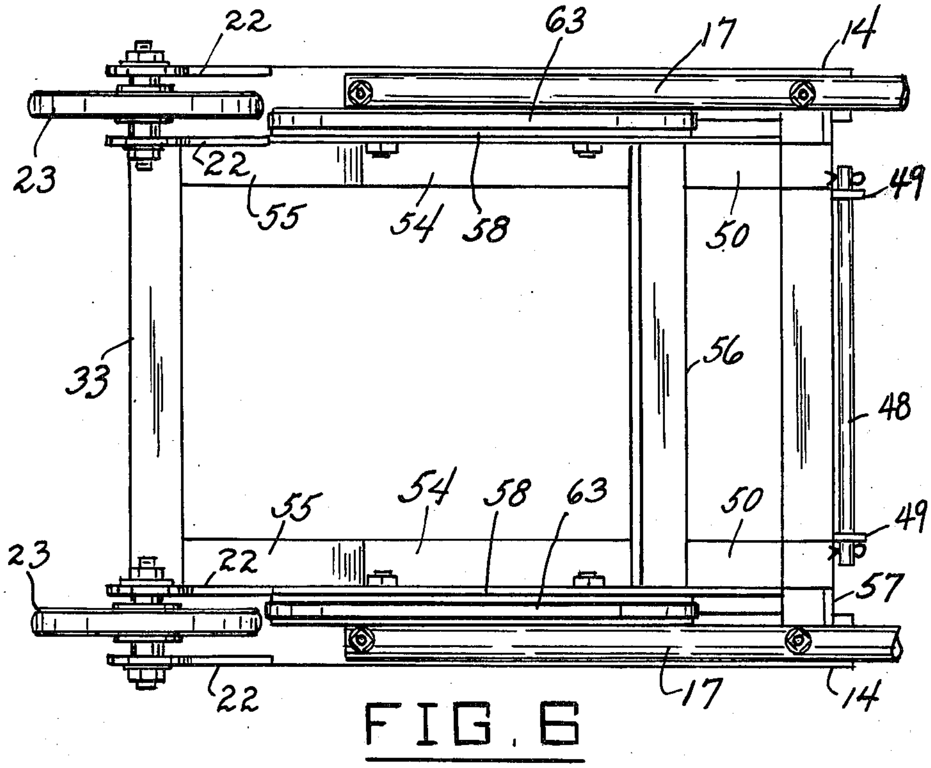
FIG. 6 is a bottom plan view taken substantially on line 6—6 of FIG. 5.

A generally U-shaped tubular metal seat frame 24 has side bar portions 25, 25 which are pivotally connected at their ends, as shown at 26, 26 in FIG. 3, to the rear portions of the lower arms 13 of main frame member 12 so that member 24 may be at times rotated to an elevated inoperative position, as shown in FIG. 3. The bight portion of seat frame 24 has spaced depending rigid post elements 27, 27 to which is rigidly secured a transverse tubular bar member 28 (see FIG. 2). Pivotally connected at 29, 29 to the opposite ends of bar member 28 are the end portions of the side bars 30, 30 of a generally U-shaped swingable tubular-metal seat strut 31. The bight portion 32 of strut 31 is nestingly engageable in the transverse bottom angle bar 33 of bottom frame 15 and is detachably secured therein by bolts 34 provided with wing nuts 35, as shown in FIG. 5.

Figure 4:
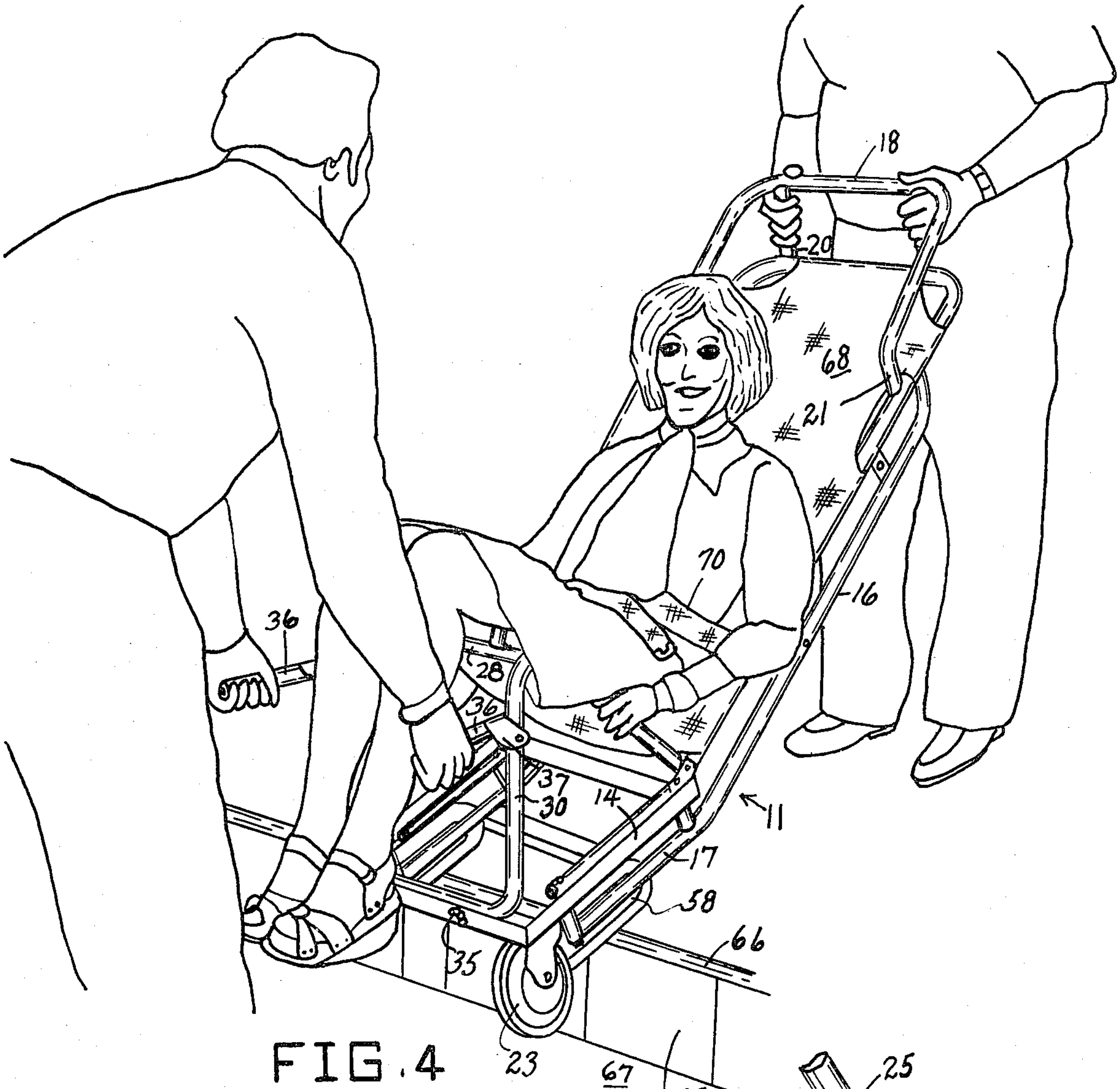
FIG. 4 is a front perspective view illustrating how the transport device of FIG. 1 is used on a step to lower an occupant downwardly on the edge of the step.

Respective supporting handles 36, 36 are pivotally connected to the side bars 30, said handles having top pivot yoke elements 37 receiving the side bars and being abuttable thereagainst in the manner shown in FIGS. 2 and 4, when the handles are swung outwardly, to enable an attendant to manually support the front portion of the assembly, as will be presently described. The handles 36 are offset from the pivot connections 38 of the yoke members 37 to enable the handles to be swung to normally non-projecting positions close to the side bars 30, as shown in FIG. 1.

Designated generally at 39 is a rear support stand comprising a pair of tubular-metal parallel leg members 40, 40 rigidly connected together at their lower portions, as viewed in FIG. 1, by a tubular cross bar 41. The lower ends of said leg members 40, 40 are provided with swivelled wheel brackets 42, 42 in which are journalled respective ground-engaging wheels 43. The top ends of the leg members 40, 40 are rigidly connected to a transverse tubular member 44 which is rotatably mounted between the tubular reinforcing bars 16, 16, enabling the leg members 40, 40 to be rotated from depending operative positions, such as shown in FIG. 1, to elevated folded positions, such as shown in FIG. 2.

Rotatably mounted between he intermediate portions of the leg members 40, 40 is a tubular bar member 45 to which are rigidly secured a pair of spaced parallel strut bars 46, 46 having spring hooks 47 at their free ends grippingly engageable on a transverse rod member 48 mounted on a pair of spaced parallel lugs 49, 49 on a cross bar 57 connecting the top ends of the angle bars 14, 14, as viewed in FIG. 2. Also connected to said cross bar 57 are respective upwardly and arcuately curved rigid strap members 50, 50 extending from the top ends of auxiliary side angle bars 54, 54, as viewed in FIG. 1, whose main portions are inwardly adjacent to and parallel to frame bar portions 17, 17, and whose lower ends are rigidly connected to transverse angle bar 33 by inclined front bar portions 55, 55. The auxiliary side bars 54, 54 are rigidly connected at their upper portions by a transverse angle bar 56.

The spring clamping hooks 47, 47 are clampingly engageable on the rod 48 to lock the rear support stand 39 in the depending operative position of FIG. 1. By manually disengaging the clamping hooks 47, 47 from rod 48, the support stand 39 may be rotated upwardly to the elevated position of FIG. 2, wherein it is received between the side-reinforcing bars 16, 16. A latching assembly 51 is provided comprising a transverse rod 52 rotatably mounted in a pair of support bars 53, 53 respectively rigidly connected between the opposite legs of the main frame 12 and the adjacent bars 16, as shown in FIG. 2. A resilient hook-like clamping strap 72 is rigidly secured on the intermediate portion of the pivoted rod 52 and is clampingly engageable with the tubular cross bar 41 in the manner shown in FIG. 2 to hold the rear stand 39 in elevated folded position until the clamping hook 72 is manually disengaged from the cross bar 41. Disengagement of the hook 72 is accomplished by rotating it upwardly from the clamping position of FIG. 2. In its elevated latched position the rear stand 39 is substantially coplanar with the upper portion of the main frame of the transport device.

Figure 7:
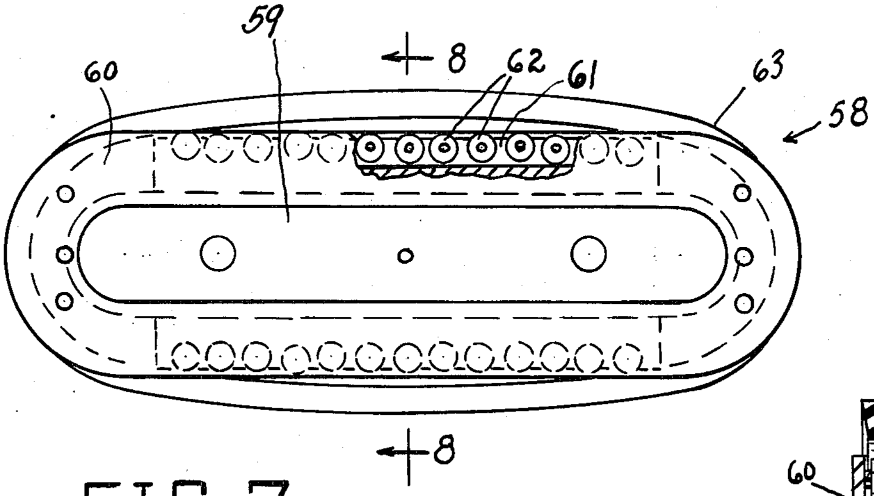
FIG. 7 is an enlarged side elevational view, partly broken away, of a tread belt assembly employed in the transport device of FIG. 1.
Figure 8:
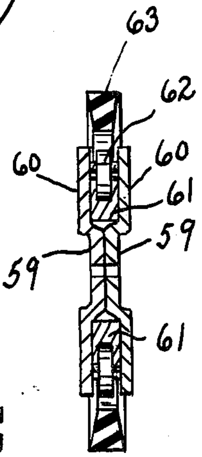
FIG. 8 is a transverse vertical cross-sectional view taken substantially on line 8—8 of FIG. 7.

As shown in FIG. 5, the auxiliary side bars 54 are in a horizontal plane spaced below that of the main seat supporting frame 15. Rigidly secured to the respective parallel auxiliary side bars 54 are longitudinally extending, vertically-positioned tread belt assemblies 58, 58, shown in detail in FIGS. 7 and 8. Each tread belt assembly comprises a pair of symmetrically-shaped elongated plate members 59, 59 secured together face-to-face at their inner web portions and having outwardly offset peripheral marginal portions 60, 60 defining a continuous peripheral groove, semi-circular at its opposite ends. Mounted in the top and bottom longitudinal portions of said peripheral groove are longitudinal roller support blocks 61, 61, in which are journalled closely-spaced plastic rollers 62. A V-belt 63 is engaged in the peripheral groove with its opposite end portions freely slidable in the respective end portions of said peripheral groove and with its longitudinal top and bottom run portions outwardly adjacent the rollers 62. The rollers are so located that the longitudinal bottom portion of the belt will project below the bottom edges of the plates 59, 59 when the belt is pressed against the rollers, for example, when the belt assemblies 58 are engaged against the edge of a step, as in FIG. 4.

From FIG. 5 it will be seen that the longitudinal bottom portions of the belts 63 are normally located sufficiently above floor level, shown at 64, so that the belts 63, 63 do not interfere with normal movement of the transport device on the supporting wheels 23, 43. However, when descending or ascending a step or ledge, as shown at 65 in FIG. 4, the lower portions of the belts may be readily engaged with the corner edge 66 of the ledge or step 65 by passing the device 11 over the edge of step 65 to clear the supporting wheels and allow the belts to supportingly engage on the edge 66, the load is transmitted to the rollers 62 and the device 11 may then glide smoothly over the step edge 66, for example, to the subjacent landing 67.

A suitable flexible cover, such as canvas, shown at 68, is secured on the main frame portion 12 and the seat frame 24 in a conventional manner, as by means of laces or cords 69 passed through marginal grommets in the cover material and suitably tied. A flexible seat belt 70, such as a canvas belt, is engaged around the side arms of main frame portion 12, the belt having a conventional buckle 71 for securing the belt around the waist of the occupant of the transport device. The belt 70 may be also employed at times to retain the seat members 24 and 31 in inoperative folded positions, as shown in FIG. 3.

When arranged as in FIG. 1, the transport device 11 may be employed as a wheeled chair for transporting a handicapped individual along a horizontal surface. When the handicapped individual is to be transported over a ledge or stairway, for example, in an emergency situation, the rear support stand 39 is disengaged from the rod 48 by raising the struts 46, 46, and the stand 39 is then swung upwardly and is locked in the inoperative position thereof shown in FIG. 2 by means of the latching assembly 51. One attendant may then supportingly grasp the post elements 20, 20 or the frame top 18 and another attendant may supportingly grasp the handles 36, 36, as shown in FIG. 4, to guide the transport device over the step edge or edges 66. This procedure may be used either in lowering the transport device over a step or in raising the device 11 over a step. In either case, the main load is placed on the rollers 62 rather than directly on the attendants, and the attendants merely act to properly balance and guide the transport device as it glides over the step edge, transverse thereto.

Thus, in said emergency situation, the transport device 11, carrying the handicapped person, is rolled to a stairway, the support stand assembly 39 is folded up and locked into place, as shown in FIG. 2, and the handles 36 are rotated outwardly to operational positions. One attendant holds the head portion of the device and the other holds the front handles 36, as shown in FIG. 4. In descending the stairs the front wheels 23 are rolled over the edge of a step and the weight of the transport device and its occupant is transferred to the tread belts 63, 63. The weight generates the frictional force necessary to cause the tread belts to turn, allowing the transport device to descend. Before the oval tread belts have cleared the edge 66 of the step, the weight of the transport device and occupant is transferred to the front wheels 23, which are then in contact with the subjacent landing 67. The process is repeated on each descending step until the transport device reaches the bottom of the stairs. The rate of descent is controlled by the two attendants, who guide the transport device in its downward movement.

When the transport device 11 is not in use, it can be folded up to the condition shown in FIG. 3 to minimize the amount of space needed for storage purposes.

While a specific embodiment of an improved transport device for handicapped persons has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. A transport device for handicapped persons comprising frame means, support means on said frame means structured to receive a person, said frame means being provided with depending front wheel means, movable friction means on the frame means rearwardly adjacent said front wheel means and located to engage on the edge of a step to receive the weight of said transport device as the front wheel means rolls over said edge in descending the step, and means causing said friction means to move responsive to said weight in a direction to allow downward movement of said frame means over said edge, wherein said frame means includes rearwardly offset side-reinforcing bars at its opposite side edges, said reinforcing bars extending substantially parallel to said opposite side edges and defining a storage space therebetween, upwardly foldable wheeled rear support means pivoted to said frame means and being receivable at times in said space between said side-reinforcing bars so as to be substantially coplanar with the upper portion of said frame means, and pivoted strut bar means on the rear support means, said strut bar means being provided terminally with spring clamping hook means lockingly engageable with said frame means to at other times lock the wheeled rear support means in a depending downwardly and rearwardly extended operative position relative to the frame means so that the device may be employed as a wheeled chair at said other times.

2. The transport device of claim 1, and wherein said movable friction means comprises continuous tread belt means movably mounted on said frame means behind the front wheel means.

3. The transport device of claim 2, and anti-friction means between said tread belt means and said frame means.

4. The transport device of claim 3, and wherein said anti-friction means comprises a plurality of rollers journalled to said frame means and being engageable by said tread belt means responsive to the engagement of said tread belt means with the edge of the step.

5. The transport device of claim 1, and wherein said movable friction means comprises tread belt means movably mounted on said frame means behind the front wheel means, and wherein said tread belt means comprises a horizontally elongated, vertically positioned, peripherally grooved member with rounded opposite ends secured longitudinally to said frame means, a continuous friction belt movably engaged in the peripheral groove of said member, and anti-friction means between the bottom of said member and said belt.

6. The transport device of claim 1, and a safety belt on said frame means engageable around a person received on said structured support means.

7. The transport device of claim 1, and wherein said frame means includes upwardly foldable seat-defining means.

8. The transport device of claim 7, and a safety belt on said frame means engageable around a person received on said structured support means and at times also engageable around said seat-defining means in its upwardly folded position.

9. The transport device of claim 1, and pivoted latch means on the frame means latchingly engageable with said rear support means in the upwardly folded position of the rear support means.

10. The transport device of claim 9, and wherein said movable friction means comprises a horizontally elongated, vertically-positioned, generally oval, peripherally grooved member mounted on said frame means rearwardly adjacent said front wheel means, and a continuous friction belt movably mounted in the peripheral groove of said member.

11. The transport device of claim 10, and anti-friction means between said friction belt and said peripheral groove.

12. The transport device of claim 10, and handle means pivoted to the front portion of said frame means and being swingable to a forwardly projecting position, and means limiting pivotal movement of said handle means when the handle means is in said forwardly projecting position.

13. The transport device of claim 12, and wherein said front portion of the frame means is at times foldable upwardly to a nonoperative storage position.

* * * * *